(12) United States Patent
Ostebo

(10) Patent No.: US 10,487,962 B2
(45) Date of Patent: Nov. 26, 2019

(54) DEEP WATER DEPLOYMENT AND RETRIEVAL SYSTEM

(71) Applicant: SUSTAINABLE OCEAN SYSTEMS, INC., Honolulu, HI (US)

(72) Inventor: Kenneth Ostebo, Honolulu, HI (US)

(73) Assignee: Sustainable Ocean Systems, Inc., Honolulu, HI (US)

( * ) Notice: Subject to any disclaimer, the term of this patent is extended or adjusted under 35 U.S.C. 154(b) by 6 days.

(21) Appl. No.: 15/993,111

(22) Filed: May 30, 2018

(65) Prior Publication Data

US 2018/0328519 A1 Nov. 15, 2018

Related U.S. Application Data

(63) Continuation-in-part of application No. 14/670,484, filed on Mar. 27, 2015, now abandoned.

(60) Provisional application No. 61/972,493, filed on Mar. 31, 2014.

(51) Int. Cl.

| F16L 1/15 | (2006.01) |
|---|---|
| C02F 1/76 | (2006.01) |
| C02F 1/32 | (2006.01) |
| B65B 3/02 | (2006.01) |
| C02F 1/44 | (2006.01) |
| C02F 103/08 | (2006.01) |

(52) U.S. Cl.
CPC .............. *F16L 1/15* (2013.01); *B65B 3/02* (2013.01); *C02F 1/32* (2013.01); *C02F 1/441* (2013.01); *C02F 1/76* (2013.01); *C02F 2103/08* (2013.01); *C02F 2201/008* (2013.01); *C02F 2303/04* (2013.01)

(58) Field of Classification Search
CPC .. C02F 1/441; C02F 2103/08; C02F 2303/04; C02F 2201/008; C02F 1/76; C02F 1/32; B65B 3/02; F16L 1/15
See application file for complete search history.

(56) References Cited

U.S. PATENT DOCUMENTS

| 7,658,843 B2 * | 2/2010 | Krock ................. B01D 61/025 210/170.11 |
|---|---|---|
| 2014/0262138 A1 * | 9/2014 | Oney ...................... F25D 1/02 165/45 |

\* cited by examiner

*Primary Examiner* — Krishnan S Menon
*Assistant Examiner* — Waqaas Ali
(74) *Attorney, Agent, or Firm* — Martin E. Hsia

(57) ABSTRACT

An integrated ocean water processing system including a vessel, an electro/hydraulic deployment and retrieval system, a desalination system, a disinfection system, a packaging system, a freezing system capable of freezing the pouches of potable water, a water storage and dissolution system, and a distribution system capable of pumping product drinking water through a buoyant surface hose to other vessels or onshore infrastructure.

2 Claims, 7 Drawing Sheets

DEEP WATER DEPLOYMENT AND RETRIEVAL SYSTEM

This application is a continuation in part of, and claims the priority of, presently pending U.S. nonprovisional patent application Ser. No. 14/670,484 filed on Mar. 27, 2015, which claims the priority of provisional patent application 61/972,493 filed on Mar. 31, 2014.

TECHNICAL FIELD

The present invention is directed to apparatus, systems and methods for producing potable water and ice from seawater. In particular, the apparatus, systems and methods of the invention involve upstream seawater harvesting, desalination, and disinfection, and downstream packaging, freezing, and distribution of the potable water obtained from the upstream processes. The apparatus, systems and methods may be mobile or vessel-based, retrofittable on existing vessels, or installed on specially manufactured vessels, and incorporate a flexible riser/submersible pump deployment/retrieval system to supply seawater from variable ocean depths for desalination. The potable water, in liquid form or frozen, may be distributed vessel-to-vessel, vessel-to-shore, or a combination thereof.

Each year, the aftermath of hurricanes, earthquakes and drought leave thousands without clean water. Millions die from the resulting diseases. Thus, clean drinking water is the number one priority during Humanitarian Assistance/Disaster Relief (HA/DR) operations and billions of dollars are spent producing, transporting and delivering the water in massive quantities to humans in extremis. To meet HA/DR water needs, bottled water has become the most widely used initial response. Depending on the availability of useful airfield infrastructure, initial emergency stocks are flown in by aircraft, both fixed and rotary wing. However, since water weighs over 8 pounds a gallon (approximately 0.90 kilograms per liter), delivery by air is limited and expensive.

For example, U.S. Air Force C-17 cargo aircraft flying from the continental U.S. during the first days of the Haiti earthquake response in January 2010 were limited to loads of 14,000 quarts (approximately 14,000 liters) of water and 14,000 food rations (69,000 lbs. (approximately 31,000 kilograms) capacity). Since port facilities at Port au Prince were unusable, Coast Guard and Navy helicopters were used to airlift food, water and medicine from waiting ships that each carried a 4000-pound (approximately 1800 kilogram) internal payload. If used entirely for water, each load could comprise only 133 cases of half-liter bottles. As a guide, the United Nations recommends 1 gallon (4 liters) per-person/per-day as an absolute minimum for basic survival. As such, each C-17 cargo jet provided one day's water for only 3,500 survivors and each helicopter for only 400 of Haiti's population of nearly 10 million. Based on published reports, 171 C-17 cargo aircraft were employed during the Haiti relief efforts. However, Port au Prince's population alone (2 million) would have required nearly 600 C-17 cargo aircraft per day based on the U.N.'s survival recommendations.

When air delivery is unfeasible, other more unconventional methods become necessary. As one of 33 U.S. Navy and Coast Guard ships deployed to Haiti to provide assistance, the aircraft carrier Carl Vinson was tasked to provide water from its 500,000 gallon (approximately 2 million liter) per day desalination systems. Since most of the onboard water is still required for the crew of more than 5,000, over the course of two weeks the Carl Vinson offloaded only 87,000 gallons (approximately 348,000 liters) total of desalinated seawater for Haitian assistance. And, since operational costs of the U.S. carrier are conservatively estimated at $1 million/day, this product water reflects a possible cost of over $160 per gallon (approximately $40 per liter).

In total, over the first three months of the Haiti earthquake response, over 22,000 US military personnel aboard 33 ships and 321 aircraft delivered a total of 2.6 million liters of water (687,000 gallons). Since only 87,000 gallons (approximately 348,000 liters) were produced on site by the Carl Vinson, the remainder (i.e., 600,000 gallons (approximately 2.4 million liters) of bottled water) had to be delivered internationally by aircraft and ship. Although the price of bottled water provided for emergency use is closely held, no estimates reflect less than $1.00 per gallon (approximately $0.25 per liter). This makes the most conservative cost of bottled water for the first three months of the Haiti relief efforts approximately $600,000 without accounting for logistics costs, e.g., associated transportation, fuel and manpower. Fuel costs alone for the 171 C-17 cargo aircraft necessary to deliver that water adds an additional $17 million (at $3/gallon (approximately $0.75 per liter) jet fuel), which would bring the conservative estimate of delivered bottled water to approximately $28.30 per gallon (approximately $7 per liter).

Since bottled water is cumbersome and expensive, as soon as feasible, emergency agencies switch to the distribution of bulk water created by portable reverse osmosis systems, which typically arrive in the weeks and months after the initial response and are usually located within the newly established refugee camps. In fact, these camps and systems are still in place in Haiti providing long-term shelter and water until the local infrastructure can be rebuilt.

Many HA/DR events occur in the burgeoning tropical zones where a significant portion of the world's people deal with an equally significant number of its weather and tectonic events. Though much of this growing population lives on or within just a few miles of the ocean's coastlines, the ocean itself has yet to be efficiently converted into a source of clean drinking water to address needs during time of crisis.

Accordingly, there is a need in the art to provide large amounts of potable water as part of the international community's initial emergency response to HA/DR events in a new, efficient, low-cost way that reduces or eliminates the present enormous logistical and financial burdens of bottled water delivery. There is also a need for the ability to harvest very substantial amounts of deep ocean water for other purposes as well, such as to provide water of appropriate pH for making cement.

BACKGROUND ART

U.S. Pat. No. 9,828,974 to Oney, incorporated herein by reference, discloses a seawater extraction system to use deep ocean seawater for cooling for offshore process applications including a submersible pump, a pipe and riser, a floating vessel, a transfer pipe, and a cooling water heat exchanger system.

U.S. Pat. No. 7,658,843 to Krock, et al, incorporated herein by reference, discloses a system to extract sea water from a depth in excess of 400 meters below the sea surface, and then to desalinate and store desalinated sea water to produce potable water.

However, although the prior art discloses the general concept of a vertical flexible pipe (a "riser") for pumping deep ocean seawater into a floating vessel, there are very substantial technical problems that must be overcome by any apparatus, system or method to harvest seawater from substantial depths, at the very least because of the uncontrollable and unavoidable motion of a floating vessel in the ocean or seas, especially directly after a natural disaster.

Further, the very substantial depths from which deep ocean seawater must be raised to reach the surface, raise technical problems that have not been disclosed or overcome by the prior art.

It is self-evident that a vessel to harvest deep seawater must have a sufficiently long riser to reach the desired harvesting depth, but the riser must be sufficiently compact for transportation on the vessel, yet rapidly deployable when the vessel reaches a desired location. A sufficiently long single piece rigid riser would be so long it would be difficult to fit on a vessel for transportation, especially in rough seas. Multiple segments of a riser that could be joined together to form a sufficiently long riser would take up too much space and/or take too long and be too difficult to assemble. Further, because the vessel will naturally move, the riser must be flexible, and cannot be rigid, or else it will break when the vessel moves. Thus, a riser that is flat when not in use and can be rolled onto a spool would be desirable, such as a fireman's hose. However, a riser that is flexible enough to be flattened, and then rolled (and unrolled) onto a spool, will also stretch under its own weight.

Further, a submersible pump at the submerged end of the riser must be provided with sufficient electrical power in order to be able to pump a sufficient amount of water to the surface. Batteries, solar cells, or other devices at the submerged end cannot provide sufficient power. Thus, the submersible pump, which is to be submerged at a great depth, must be powered remotely, usually by power from a vessel, transmitted by a power cable. But the amounts of power necessary to pump sufficient amounts of seawater up from the depths require that the power cable be quite substantial in weight and diameter, so that sufficient current can be efficiently carried by the cable along its full length and provided to the submersible pump (just as a pipe carrying water must have a large diameter to efficiently carry a large amount of water, an electrical cable carrying electricity must have a large diameter to efficiently carry a large electrical current). The weight of such a length of cable will therefore cause the cable to stretch from its own weight. But because the cable usually contains metal or other wiring, the amount the cable will stretch will probably differ from the amount the riser would stretch. Thus, the vertical riser and the power cable cannot be joined together along their length as a single structure. If the vertical riser stretches more than the power cable, then the cable will bear the weight of the riser and submersible pump, and either break or separate from the submersible pump, causing a breakdown. If the power cable stretches more than the vertical riser, then the riser will bear the weight of the cable (which is quite substantial because the cable must carry sufficient current, as described above), and break, or the power cable's own weight will cause the cable to separate from the submersible pump, again causing a breakdown.

Also, when the submersible pump with a separate riser and power cable are raised to the surface, the riser and power cable will tangle with each other (fouling).

For a further example, a vessel will pitch, roll and yaw when on the ocean, which may cause the vessel to come in contact with the riser or the power cable, chafing against a flexible riser or the power cable, and breaking a rigid riser or the power cable. Such collisions could be especially damaging to the riser or the power cable if either comes in contact with the chine of a vessel: the chine is a sharp change in angle in the cross section of a vessel hull. If a riser or the power cable collides with this sharp change in angle, the riser or the power cable could be severely damaged.

Moreover, it may be prohibitively expensive to build specialized vessels to incorporate devices for harvesting and desalinating seawater. Many cargo vessels are now built to receive and transport intermodal shipping containers of various sizes, which often (but not always) conform to standards set by the International Standards Organization ("ISO"), so they are often referred to as ISO containers. Such shipping containers have fittings (corner castings) on their corners that can accept "twistlocks" to allow containers to be easily attached to, and detached from, each other, or to vessels or other modes of transportation (such as railroad cars or trucks). A majority of mass produced goods are now shipped using shipping containers on cargo vessels configured to receive intermodal shipping containers.

SUMMARY OF INVENTION

The present invention relates to systems and methods that integrate an upstream process that harvests, desalinates, and disinfects seawater, with a downstream process that packages, freezes, and distributes potable water. In one embodiment, the system is at least partially based on a floating vessel. In another embodiment, a deployment/retrieval mechanism is operatively connected to the floating vessel. In an alternative embodiment, the deployment/retrieval system is modular and retrofittable to existing vessels, as described below. The deployment/retrieval mechanism may include a pump and riser. The system may include a reverse osmosis station for desalination. The reverse osmosis station may include integrated high pressure vessels.

In addition, the system may include an ultraviolet and chemical disinfection station. A quality control station may also be incorporated into the system. The disinfected and inspected water may be packaged in pouches, which may be accomplished in a pouch packaging station. Likewise, the pouches may be frozen, which may be accomplished in a pouch freezing station. In another embodiment, a distribution system may distribute the product water. The distribution system may include at least one pump and at least one hose operatively connected to each other and the vessel. In yet another embodiment, a vessel-based system may include a deployment/retrieval mechanism, a reverse osmosis station, an ultraviolet and chemical disinfection station, a quality control station, a pouch packaging station, optionally, a pouch freezing station, and a distribution system.

The system may be deployed for a predetermined length of time to variable predetermined depths in the ocean.

Additional to the embodiment of a dedicated Coastal Water Factory vessel, in an alternative embodiment, the integrated systems incorporated in this invention can be skid mounted (a skid is a marine term for a platform on which things are mounted and moved, functioning like a pallet) and modularized so that the equipment can be transported/shipped/flown to areas of need via standard transportation methods and configured to local vessels when available to address additional capacity requirements and expedite implementation. Preferably, this modularization allows most or all of the mechanisms, systems, stations, and other apparatus and materials described above to be stored, transported and used in intermodal shipping containers, so that they can be employed on available ships already configured to transport intermodal shipping containers, or that can be readily configured to accept intermodal shipping containers.

Preferably, the invention comprises a deployment and retrieval device for a flexible riser and a cable operably connected at their distal ends to a cylindrical submersible pump approximately coaxial with said riser, on a vessel having a chine, comprising:

a rotatable riser spool mounted on the vessel for winding and unwinding the riser for deployment and retrieval;

a riser hydraulic drive drivably connected to the riser spool to drive rotation of the riser spool;

a rotatable cable spool mounted on the vessel for winding and unwinding the cable for deployment and retrieval;

a spool hydraulic drive drivably connected to the cable spool to drive rotation of the cable spool;

a flow control valve operably connected to one of the hydraulic drives to control rotation of one of the spools to rotate at a different rate from the other spool;

a hydraulic ram mounted to the vessel;

a movable carriage mounted on the hydraulic ram;

a wheeled guide mounted on the carriage to be horizontally movable by the hydraulic ram and the carriage along a throw centered in front of the spools:

whereby rotation of the spools at different rates allows winding and unwinding of the riser on the riser spool and winding and unwinding of the cable on the cable spool at different rates to compensate for differential stretch of the riser and the cable;

a riser guide attached to the vessel, positioned below the throw to receive the riser and said cable being wound and unwound from the spools, having an upper portion extending downwardly below the chine and having a junction below the upper portion with a bell flaring out from the upper portion by at least 15 degrees;

wherein the upper portion has a substantially constant cross section of a race track having two substantially parallel straightaways joined by two substantial semicircles;

wherein the semicircles have a diameter slightly greater than the diameter of the cylindrical submersible pump and the straightaways are slightly longer than the throw less the diameter of the submersible pump;

wherein the riser and the cable lead from the riser spool and the cable spool onto the wheeled guide, whereby winding and unwinding the riser spool and the cable spool deploys and retrieves the pump while minimizing fouling despite differential stretch rates of the riser and the cable, whereby the wheeled guide moves back and forth along the throw to wind and unwind the riser and the cable evenly on the spools, and whereby the riser and the cable are prevented from chafing against the chine by the riser guide and the bell.

In another embodiment, the invention is deployment and retrieval device for a flexible riser and a cable operably connected at their distal ends to a cylindrical submersible pump approximately coaxial with the riser, on a vessel having a chine, comprising:

a rotatable riser spool mounted on the vessel for winding and unwinding the riser for deployment and retrieval;

a riser drive drivably connected to the riser spool to drive rotation of the riser spool;

a rotatable cable spool mounted on the vessel for winding and unwinding the cable for deployment and retrieval:

a spool drive drivably connected to the cable spool to drive rotation of the cable spool;

a differential operably connected to one of the drives to control rotation of one of the spools to rotate at a different rate from the other spool;

a wheeled guide horizontally movable along a throw centered in front of the spools;

whereby rotation of the spools at different rates allows winding and unwinding of the riser on the riser spool and winding and unwinding of the cable on the cable spool at different rates to compensate for differential stretch of the riser and the cable;

wherein the riser and the cable lead from the riser spool and the cable spool onto the wheeled guide, whereby winding and unwinding the riser spool and the cable spool deploys and retrieves the pump while minimizing fouling despite differential stretch rates of the riser and the cable, and whereby the wheeled guide moves back and forth along the throw to wind and unwind the riser and the cable evenly on the spools.

In still another embodiment, the invention is a deployment and retrieval device for a flexible riser and a cable operably connected at their distal ends to a cylindrical submersible pump approximately coaxial with said riser, on a vessel having a chine, said riser and said cable being deployed and retrieved from spools leading to a wheeled guide horizontally movable along a throw centered in front of said spools, comprising:

a riser guide attached to the vessel, positioned below the throw to receive the riser and the cable being wound and unwound from the spools, having an upper portion extending downwardly below the chine and having a junction below the upper portion with a bell flaring out from the upper portion by at least 15 degrees;

wherein the upper portion has a substantially constant cross section of a race track having two substantially parallel straightaways joined by two substantial semicircles;

wherein the semicircles have a diameter slightly greater than the diameter of the cylindrical submersible pump and the straightaways are slightly longer than the throw less the diameter of the submersible pump;

wherein the riser and the cable lead from the riser spool and the cable spool onto the wheeled guide, whereby winding and unwinding the riser spool and the cable spool deploys and retrieves the pump while minimizing fouling despite differential stretch rates of the riser and the cable, whereby the wheeled guide moves back and forth along the throw to wind and unwind the riser and the cable evenly on the spools, and whereby the riser and the cable are prevented from chafing against thye chine by the riser guide and the bell.

BRIEF DESCRIPTION OF DRAWINGS

Further features and advantages of the present invention from the following detailed description that is provided in connection with the drawings described below.

DESCRIPTION OF EMBODIMENTS

The present invention relates to systems and methods for producing potable water aboard a vessel or similar mobile implementation. In one embodiment, the systems and methods of the invention involve desalination and disinfection of harvested seawater and subsequent packaging (and optional freezing) prior to distribution. In particular, the present invention relates to systems designed to harvest seawater from variable depths, desalinate and disinfect the harvested water such that it meets municipal drinking water parameters, package the product water in various-sized containers and, optionally, freeze at least a portion of those containers. In addition, the present invention relates to methods of recycling at least a portion of the brine byproduct water for enhancement of the freezing process. The product water may be distributed in packaged form (liquid and/or frozen) and/or non-packaged form, vessel-to-vessel and/or vessel-to-shore, using the systems of the invention.

Figure 1:
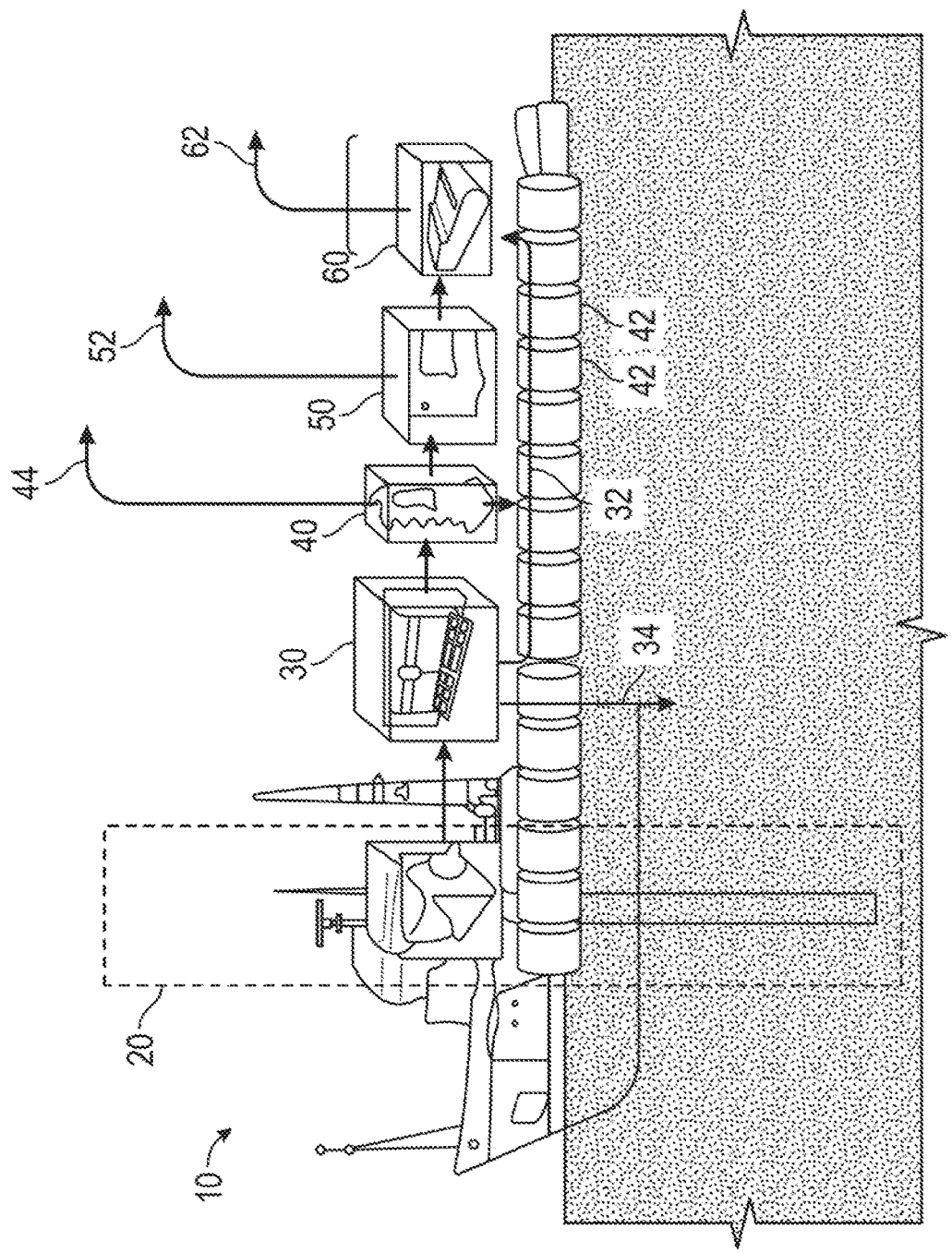
FIG. 1 illustrates the stations associated with the systems and methods of the present invention.

As shown in FIG. 1, the coastal water factory (CWF) may employ five separate stations that are integrated or operatively connected to each other. While FIG. 1 illustrates a floating vessel 10, the present invention contemplates other implementations where the stations are integrated. For example, the stations may be included on a plurality of floating vessels that are operatively connected to each other. In this aspect, one or more stations may be included on a first vessel, one or more stations may be included on a second vessel, and so on.

With regard to FIG. 1, floating vessel 10 may include a deployment and retrieval station 20. In one embodiment, the deployment and retrieval station has a variable depth capability. In another embodiment, the deployment and retrieval station has a fixed depth. Regardless of the variable or fixed depth, the present invention contemplates retrieval and harvesting of seawater at a depth that supports the intake of non-turbid ocean water. Without being bound to any particular theory, the non-turbid ocean water results in better harvesting than if taken from the surface layer/shallow water.

Figure 2:
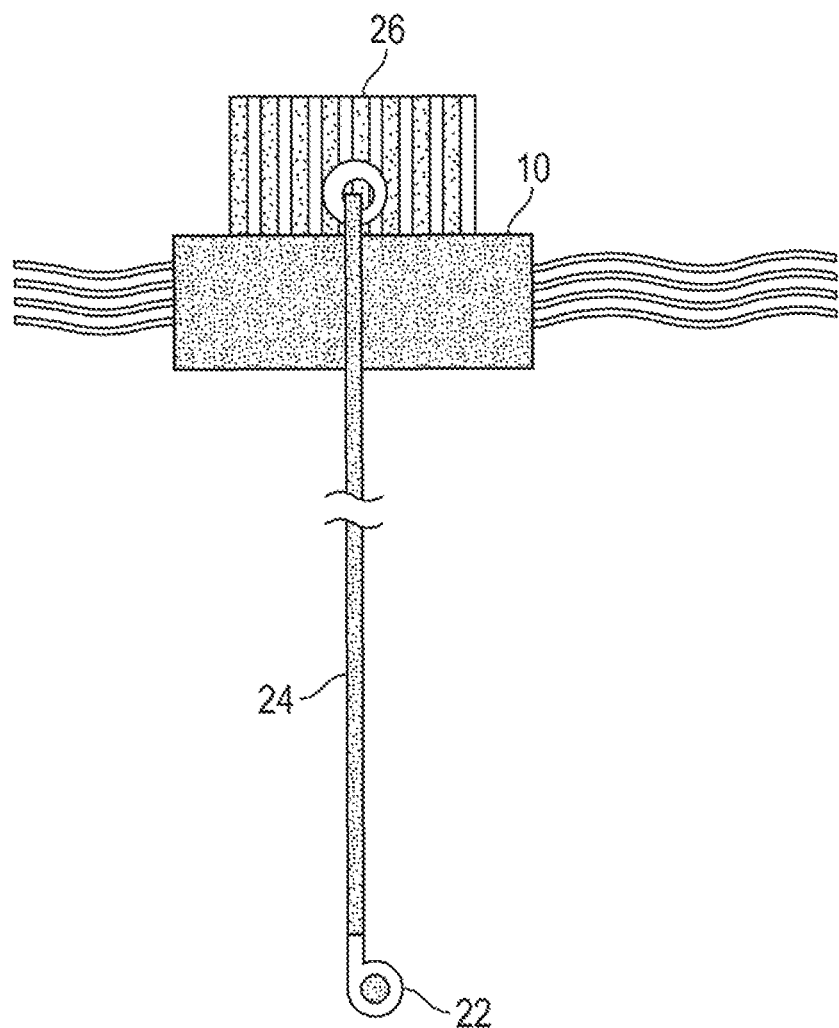
FIG. 2 illustrates a vessel-based implementation of an embodiment of the present invention.

In one embodiment (generally shown in FIG. 2), the harvesting in the deployment and retrieval station 20 may occur using a submersible pump 22 that pumps the sea water into a flexible pipe or riser 24 onto the floating vessel 10 or platform, where it is transferred to the desalination station 30. In one embodiment, the flexible riser/submersible pump system is capable of harvesting seawater from variable depths down to at least about 1000 meters.

In this aspect of the invention, the deployment and retrieval station 20 may house a winch for deployment and retrieval of the riser and, optionally, the pump. Once the riser and, optionally, the pump, has been deployed to the desired depth, the pump is operated to pump seawater to the desalination station 30. Without being bound by any particular theory, the retractable option provides depth change ability for different seasons to avoid biological considerations when necessary. In this aspect of the present invention, the system may also include a positive or negative feedback system. The feedback system may include a measurement system capable of measuring ocean biology productivity. Examples of measurements of ocean biology productivity include, but are not limited to, amount of biomass, amount of sunlight, amount of nutrients, and temperature at a given depth, In response to the productivity and/or temperature measurements, the depth of the pipe or hose may be increased or decreased. For example, the depth of the pipe or hose may be decreased to harvest water with less productivity.

However, the depth from which the seawater of the present invention is extracted depends on varying factors. Regardless of the latitude, the extraction depth contemplated by the present invention is at least about 50 meters. In another embodiment, the extraction depth is about 50 meters to about 1000 meters. However, because the CWF may be used in crisis situations where the immediacy of the need is of the utmost importance, the environment aspects typically considered may be less of a factor in considering the water depth. As such, it also contemplated that the extraction depth may be less than about 50 meters in certain latitudes and/or in certain seasons. In fact, in one embodiment, the seawater may be drawn from the surface or near the surface.

In the alternative, the extraction depth may be any depth below the natural thermocline to draw from the non-productive region of the ocean. For example, in one embodiment, the extraction depth may be at least about 100 meters in high latitude locations or in mid latitude locations during winter. In this aspect, the extraction depth may be from about 100 meters to about 1000 meters. In another embodiment, the extraction depth may be at least about 250 meters. In this aspect, the extraction depth may be from about 250 meters to about 1000 meters.

In one embodiment, the extraction may occur using the method of sea water extraction disclosed in U.S. Pat. No. 7,658,843, the entire disclosure of which is incorporated by reference herein.

The CWF may also include a desalination station. For example, as shown in FIG. 1 a desalination station 30 may be housed on the floating vessel 10 downstream of the deployment and retrieval station 20. The desalination station 30 may include a reverse osmosis system. As would be understood by those of ordinary skill in the art, reverse osmosis is a method of separating fresh water from sea water by forcing the collected sea water through an impermeable membrane wherein the brine concentrate is left behind. In this aspect of the invention, two fluids result from the desalination station 30: (1) product water containing less than 1000 parts per million (ppm) Total Dissolved Solids (TDS) and (2) brine by-product containing more than 35,000 ppm TDS. As such, the desalination station 30 may include at least one impermeable membrane, at least one output for the brine by-product, and at least one output for the product water resulting from the reverse osmosis process. In particular, the product water may be separately directed to (1) the disinfection station 40 and (2) dissolution of brine by-product before reintroduction to the open ocean. In particular, the CWF may maintain onboard storage tanks capable of holding variable amounts of product water from the desalination station 30 that are used for dissolution of brine by-product before reintroduction to the ocean (shown as 34 in FIG. 1).

The desalination station may process up to 500,000 gallons (approximately 2 million liters) of potable water from the harvested seawater per day. In one embodiment, the CWF includes at least one desalination station. In another embodiment, the CWF includes a plurality of desalination stations. For example, a CWF in accordance with the present invention may include at least two desalination stations each capable of processing up to 500,000 gallons (approximately 2 million liters) of potable water from the harvested seawater per day.

The CWF may also include a disinfection station 40. In one embodiment, the product water created by reverse osmosis in the desalination station 30 may be disinfected using redundant techniques. For example, the disinfection station 40 may include the exposure of the product from the desalination station 30 to ultra violet light and/or sodium/calcium hypochlorite in dosages necessary to render inert all bacterial and viral elements. In another embodiment, the disinfection station 40 may include any other suitable commercial disinfectant systems that render inert all bacterial and viral elements. A quality control laboratory on the vessel (not shown) is contemplated to ensure product water meets necessary local and international standards for consumption.

As shown in FIG. 1, in one embodiment, the disinfection system 40 may be housed on the floating vessel 10 downstream of the desalination station 30. The disinfection station is connected to storage tanks 42. In one embodiment, the storage tanks have the capacity to hold at least about 500,000 gallons (approximately 2 million liters) of potable water. In another embodiment, the storage tanks have the capacity to hold at least about 750,000 gallons (approximately 3 million liters) of potable water. In yet another embodiment, the storage tanks have the capacity to hold at least about 1,000,000 gallons (approximately 4 million liters) of potable water. In still another embodiment, the storage tanks have the capacity to hold about 1,500,000 gallons (approximately 6 million liters) of potable water. The storage tanks may be connected to a distribution system for delivery of potable water to an intended destination. The intended destination may be a second floating vessel or platform, an on-shore receiving vessel, or a combination thereof.

The disinfection station 40 has the capability of producing up to about 500,000 gallons (approximately 2 million liters) of potable water per day. In one embodiment, at least about 750,000 gallons (approximately 3 million liters) per day of potable water are realized from the disinfection station. In another embodiment, the disinfection station 40 has the capability of producing up to about 1 million gallons (approximately 4 million liters) of potable water per day, which can be pumped to (i) the intended destination, (ii) the storage tanks 42, and/or (iii) the packaging station.

In particular, the present invention also relates to the ability to distribute potable water exiting the disinfection station 40 in bulk. In one embodiment, the distribution system (shown generally as 44 in FIG. 1) includes a hose, a barge, or other means to transfer the potable water from the disinfection station 40 to another vessel and/or shore. For example, the potable water may pass through a buoyant flexible hose from the CWF to vessels lying alongside. In another embodiment, potable water may pass through a buoyant flexible hose from the CWF to infrastructure ashore capable of water distribution or storage. In both embodiments, the power and pressure necessary to move the potable water in bulk from vessel to vessel or vessel to shore, may be provided by integrated systems.

The packaging station 50 may be downstream of the disinfection station 40. The potable water transferred to the packaging station 50 may be less than 100 percent of the output from the disinfection station 40 because, as discussed above, at least a portion of the potable water from the disinfection station 40 may be transferred in bulk to an intended destination 44 separate from the vessel and/or the storage tanks 42.

The packaging station 50 provides the system the ability to package potable water from the disinfection station 40 in variously sized containers. In one embodiment, package sizes may range from about 0.5 liter pouches to about 5 liter pouches for personal consumption. For example, the personal consumption packages may range from about 2 liters to about 3 liters. In one embodiment, the personal consumption package sizes may be manufactured mechanically and filled aboard the vessel. For example, it is contemplated that large rolls of plastic may be heat sealed around the edges (with the exception of one portion left unsealed for filling) in the packaging station 50 to create the personal consumption packages. After the potable water is loaded into the personal consumption packages, the unsealed portion may be sealed and perforated. The perforated area may be used for ease of carrying, ease of opening for drinking, or both.

In another embodiment, package sizes range from about 1000 liter "cubes" to about 20,000 liter bladders. In contrast to the personal consumption packages, the larger cubes and bladders may be stored aboard and filled off vessel or ashore using the bulk distribution system. In one embodiment, the cubes and bladders may be stored in containers for ease in stacking, offloading, and transport via train or truck once offloaded on shore.

In one embodiment, the packaging station 50 may package about 50,000 gallons (approximately 200,000 liters) per day of potable water. In another embodiment, the packaging station 50 may package about 100,000 gallons (approximately 400,000 liters) per day of potable water. In still another embodiment, the packaging station 50 may package about 200,000 gallons (approximately 800,000 liters) per day of potable water.

Figure 3:
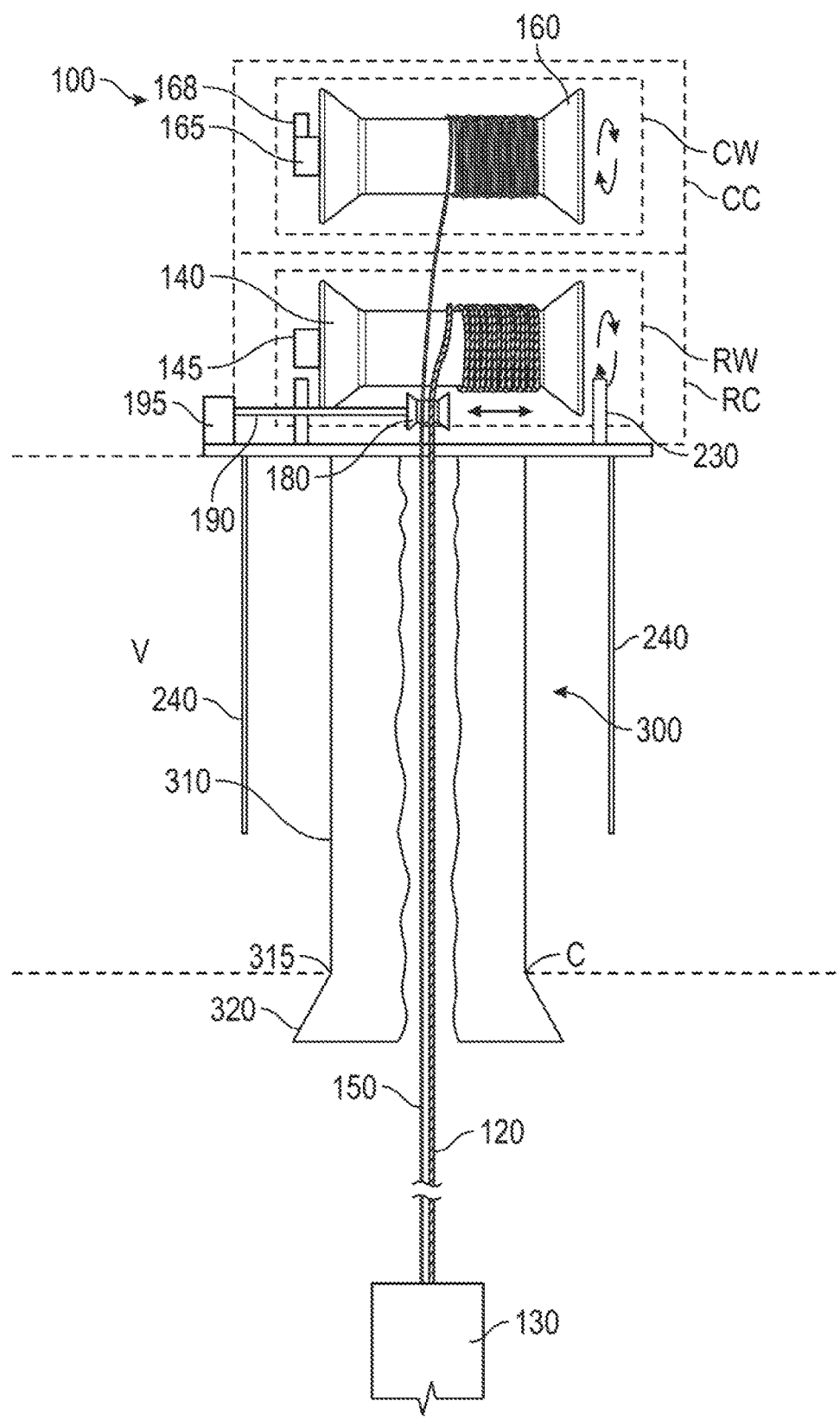
FIG. 3 is an elevational cutaway view from the front of a device according to an alternative embodiment of the present invention, with movable mounting brackets omitted for clarity, mounted on the starboard (right) side of a vessel.

The CWF may also include a freezing station 60 operatively connected to and downstream of the packaging station. As shown in FIG. 3, the freezing station 60 may receive packaged potable water from the packaging station 50 aboard the floating vessel 10. In this aspect of the invention, freezing systems include, but are not limited to, brine freezing, plate freezing, nitrogen immersion freezing, tunnel freezing, and combinations thereof. If the freezing station employs brine freezing, at least a portion of the brine by-product exiting the desalination station 30 may be transferred to the freezing station 60 via pipe 32. The freezing systems would be used to create freezing temperatures below normal freezing point (0.degree. Celsius). Frozen packets may then be assembled on pallets for trans-loading off of the vessel. Without being bound by any particular theory, the present invention contemplates the ability to freeze the personal consumption packages (i.e., the 0.5-5 liter pouches) to support the storage and maintenance of perishable items like food and medicine. In another embodiment, it is contemplated that, once melted, the frozen personal consumption packages (i.e., 0.5-5 liter ice packets), may be used for its original purpose of personal water consumption. Each station/system may have multiple sub-processes and components, which are contemplated to be integrated for use in differing combinations to support production and distribution of various drinking water products as well as brine water by-product dissolution. For example, the present invention contemplates modularized stations that may be shipped/flown to crisis areas for integration and fixing to local vessels with suitable deck space should a dedicated CWF not be available in region of need.

In one embodiment, the system of the invention is offshore. For example, should the system be deployed to a coastline recently devastated by a natural disaster, the CWF may maintain position offshore using an onboard mooring or positioning system to harvest water from a depth necessary to achieve non turbid seawater that ultimately results in product water distributed ashore using buoyant flexible hoses. The stations shown in FIG. 1, i.e., the deployment and retrieval station, the desalination station, the disinfection station, the packaging station, the freezing station, and the distribution system, are integrated to deliver potable water in bulk and/or in packaged form (liquid and/or frozen). If the potable water is delivered ashore in packaged form, transloading of palletized, pouched ice or water may be powered by independent, onboard electric generation. In this aspect, all or most necessary provisions for the crew and process operations for many weeks may be maintained on board along with quality control and laboratory requirements. Additionally, the CWF may be configured to operate as a base for communications and coordination of humanitarian efforts should it be required. In another embodiment, the system of the invention is located next to shore or at port. In this configuration, the system would still perform all functions using coastal or port water.

In yet another embodiment of the invention, the system of the invention would harvest clean raw water offshore, process and store bags and ice in bulk, and return to shore for offload and distribution. The system may also include a mooring/anchor system.

Referring to FIG. 3, shown is an elevational cutaway view from the front of a device according to an alternative embodiment of the invention comprising a deep water deployment and retrieval system 100 for deploying and retrieving a riser 120 mounted on the right (starboard) side of a vessel V. Preferably, the riser is a long flexible hose or drop pipe, collapsible so it can be mounted on a spool, similar to a collapsible fire hose coated with PET polymer, and sold under the trademark Boreline. Practically, the diameter of the riser, when filled, is between approximately 4 inches (10 centimeters) and 8 inches (20 centimeters).

A submersible pump 130 is attached to the riser at a distal end, and wound around a rotatable riser spool 140. Preferably, the riser spool 140 is approximately 6 feet (1.8 meters) wide and housed in a riser intermodal shipping container RC (shown in dotted line) attached to the deck of a vessel, that has a riser window RW (also shown in dotted line) cut out of the side, for deployment and retrieval of the riser 120.

Preferably a power cable 150 is also attached at a distal end to the submersible pump 130 to provide power, and wound around a rotatable cable spool 160. Preferably the cable 150 is capable of carrying 250 amps and comprises 1 inch diameter (approximately 2.5 centimeters) copper, clad in insulation. Preferably, the cable spool 160 is approximately 6 feet (1.8 meters) wide and housed in a cable intermodal shipping container CC (shown in dotted line) that is attached on top of the riser container RC. The cable container CC preferably has a cable window CW (also shown in dotted line) cut out of the side, for deployment and retrieval of the cable 150. Preferably the riser spool 140 and cable spool 160 are rotatable by being mounted on axles rotatably mounted on cradles (not shown), but any method for making the riser spool 140 and cable spool 160 can be employed with this invention.

The inventor believes that, under the weight of the submersible pump (approximately 750 pounds (340 kilograms) and their own weight (approximately 2400 pounds (1088 kilograms) for riser and approximately 3400 pounds (1542 kilograms) for riser), the riser would stretch about 4%, while the cable would stretch about 1%.

Both of the riser 120 and cable 150 extend from the riser spool 140 and cable spool 160, respectively, to a wheeled guide 180 that is mounted on a horizontally movable carriage 190. Any apparatus can be used to support the horizontally movable carriage 190 in order to make the wheeled guide 180 horizontally movable. It is preferred that the horizontally movable carriage 190 be powered by a conventional hydraulic ram 195.

The horizontal extent of the movement of the wheeled guide 180 is referred to as the "throw." The throw of the wheeled guide is preferably centered in front of, and approximately the width, of the riser spool 140 and the cable spool 160.

The riser spool 140 and cable spool 160 are preferably provided with hydraulic, electric, or other powering mechanisms so they can rotate at slightly different rates, so that as the riser 120 and cable 150 are stretched at different rates by their weights, as described above, additional lengths of riser 120 and cable 150 are deployed or retrieved at different rates to compensate, so that the connection of the riser 120 and cable 150 to the submersible pump 130 is not broken. Preferably hydraulic drives are used because of the marine environment, and the different rates are achieved by using a flow control valve attached to one of the hydraulic drives. However, other devices to create different rotation rates, referred to as a "differential", can be used. The different rates also help to compensate for differences in deployment or retrieval rates as the riser 120 and cable 150 are rolled onto the riser spool 140 and cable spool 160, due to differences in the diameters of the riser 120 and cable 150. Preferably, because the vessel is in a marine environment, the spools are not driven by electricity, and the riser spool 140 is driven by a riser hydraulic drive 145 and the cable spool 160 is driven by a cable hydraulic drive 165. Preferably a flow control valve 168 is operably connected to the cable hydraulic drive 165 to control the speed of rotation of the cable spool 160, thus achieving different rotation rates for the riser spool 140 and cable spool 160. However, the flow control valve can be operably connected to the riser hydraulic drive 145 instead.

It is preferred that the horizontally movable carriage 190 be provided with hydraulic, electrical, or other power assistance, and that the horizontal movement of the carriage 190 and wheeled guide 180 be manually controlled, so that the riser 120 and cable 150 can be smoothly rolled on and off the riser spool 140 and cable spool 160 in layers created by horizontal movement of the wheeled guide 180 through which the riser 120 and cable 150 are passing. Manual control is preferred to avoid loss of attention if rolling on and off the spools is automated, which can create a safety hazard. However, the horizontal movement of the wheeled guide 180 can be automated, if desired. Of course, separate wheeled guides could be provided for the riser 120 and cable 150, if desired, moving either dependently or independently, as desired to maximize efficiency of rolling the riser 120 and cable 150 on and off the riser spool 140 and cable spool 160 (referred to as "spooling").

Figure 4:
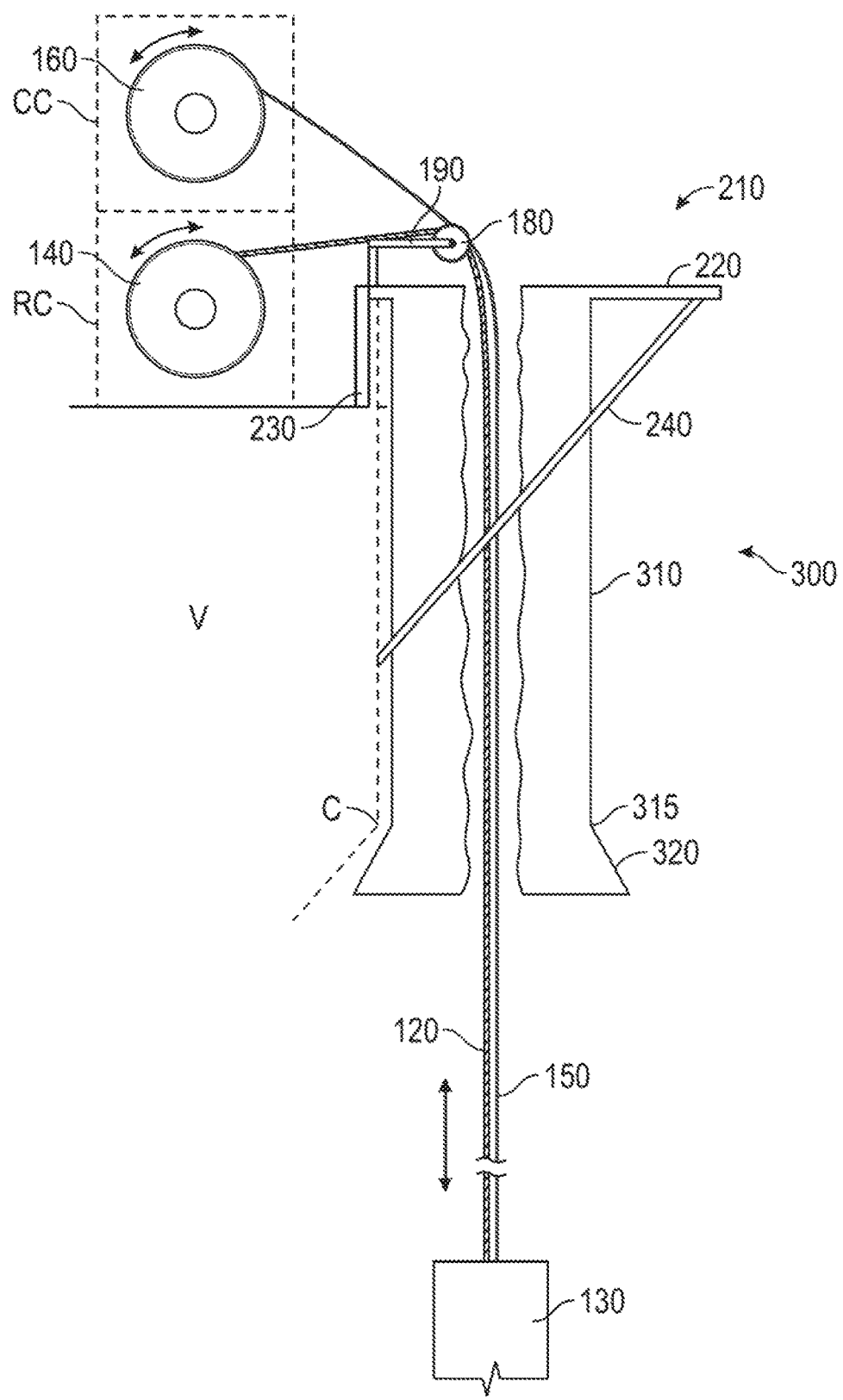
FIG. 4 is an elevational cutaway view from the right side of the device (from the aft end of the vessel) of FIG. 3, mounted on the starboard (right) side of the vessel.

Referring to FIG. 4, shown is an elevational cutaway view of the device of FIG. 3 from the right side (from the aft end of the vessel V) (with the hydraulic ram 195 omitted for clarity). As can be seen, the riser container RC is attached to the deck of the vessel V, and the cable container CC is attached to the top of the riser container RC.

Preferably a harvesting platform 210 having a deck 220 is attached to, and projecting outward from, the side of the vessel V, by vertical stanchions (not shown) that slide into vertical rails 230 projecting upward from the deck of the vessel V, just inboard of the railing R on the side of the vessel V. The deck 220 of the harvesting platform is preferably approximately even with the top of the railing R on the vessel V. Preferably, the harvesting platform 210 is also supported by securing stays extending from the side of the vessel V to the outboard edge of the deck 220.

Preferably, a hollow riser shield 300 extends downward from the harvesting platform 210. The wheeled guide 180 is placed so that the riser 120 and cable 150 descend through the interior of the riser shield 300. Preferably the riser shield 300 has an upper portion 310 having a substantially constant cross section that extends down past the chine C of the vessel C, and then flares out at a junction 315 into a bell 320. Practically, the sides of the bell 320 extend at least 15 degrees from the vertical outward from the upper portion 310 of the riser shield 300, and it is preferred that the sides of the bell 320 extend between 20 degrees and 30 degrees from the vertical outward from the upper portion 310 of the riser shield 300. Optimally, the bell 320 extends 25 degrees from the vertical outward from the upper portion 310 of the riser shield 300.

Preferably, the upper portion 310 of the riser shield 300 extends to, or approximately 2 feet (approximately 600 centimeters) below, the chine C, before the riser shield 300 flares out into the bell 320.

Figure 5:
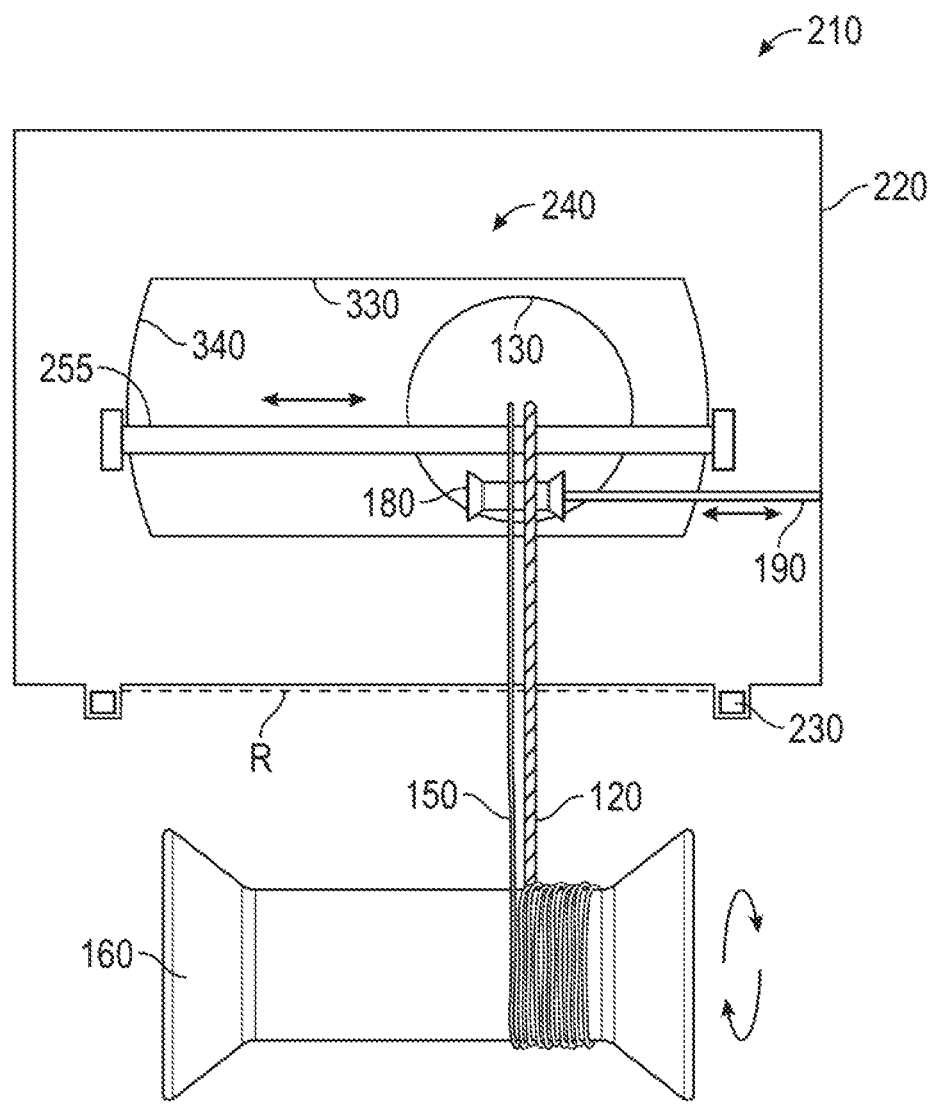
FIG. 5 is a top plan view of the device of FIG. 3, mounted on the starboard (right) side of the vessel.

Referring to FIG. 5, shown is a top plan view of the harvesting platform 210, with the submersible pump 130 retrieved and at least partially received in the riser shield 300. As can be seen, the deck 220 of the harvesting platform 210 has an aperture 240 that conforms to and leads into the hollow interior of the riser shield 300, and the wheeled guide 180 is moved horizontally above the aperture 240 by the horizontally movable carriage 190.

The cross section of the upper portion 310 of the riser shield 300 where it is attached to the deck of the harvesting platform is preferably in the shape of a racetrack, with two parallel spaced apart straightaways 330, joined by approximate semicircles 340. As can be seen, the submersible pump 130 is approximately cylindrical and approximately coaxial with the riser 130. Preferably, the length of the straightaways is approximately equal to the throw of the wheeled guide, less the diameter of the submersible pump, and the diameter of the semicircles (which is the width of the racetrack) is greater than the diameter of the submersible pump 130.

In this manner, the wheeled guide can reel the riser 120 and cable 150 in (including into the interior of the top portion 310 of the riser shield 300) and out, while minimizing contact of the submersible pump 130 with the interior of the riser shield 300. Further, in rough seas or other movement of the vessel V while the riser 120, cable 150 and submersible pump 130 are deploying or deployed, the bell 320 prevents contact with the chine C of the vessel V, and the angle at the junction 315 between the bell 320 and the upper portion 310 of the riser shield 300 is gentle enough that the riser 120 and cable 150 will be protected against chafing by contact with that junction 315.

Preferably, an antifriction roller 255 is mounted on the deck 210 of the harvesting platform 220, spanning across the aperture 240, approximately parallel to the straightaways 330, over which the riser 120 and cable 150 roll before reaching the wheeled guide 180.

Figure 6:
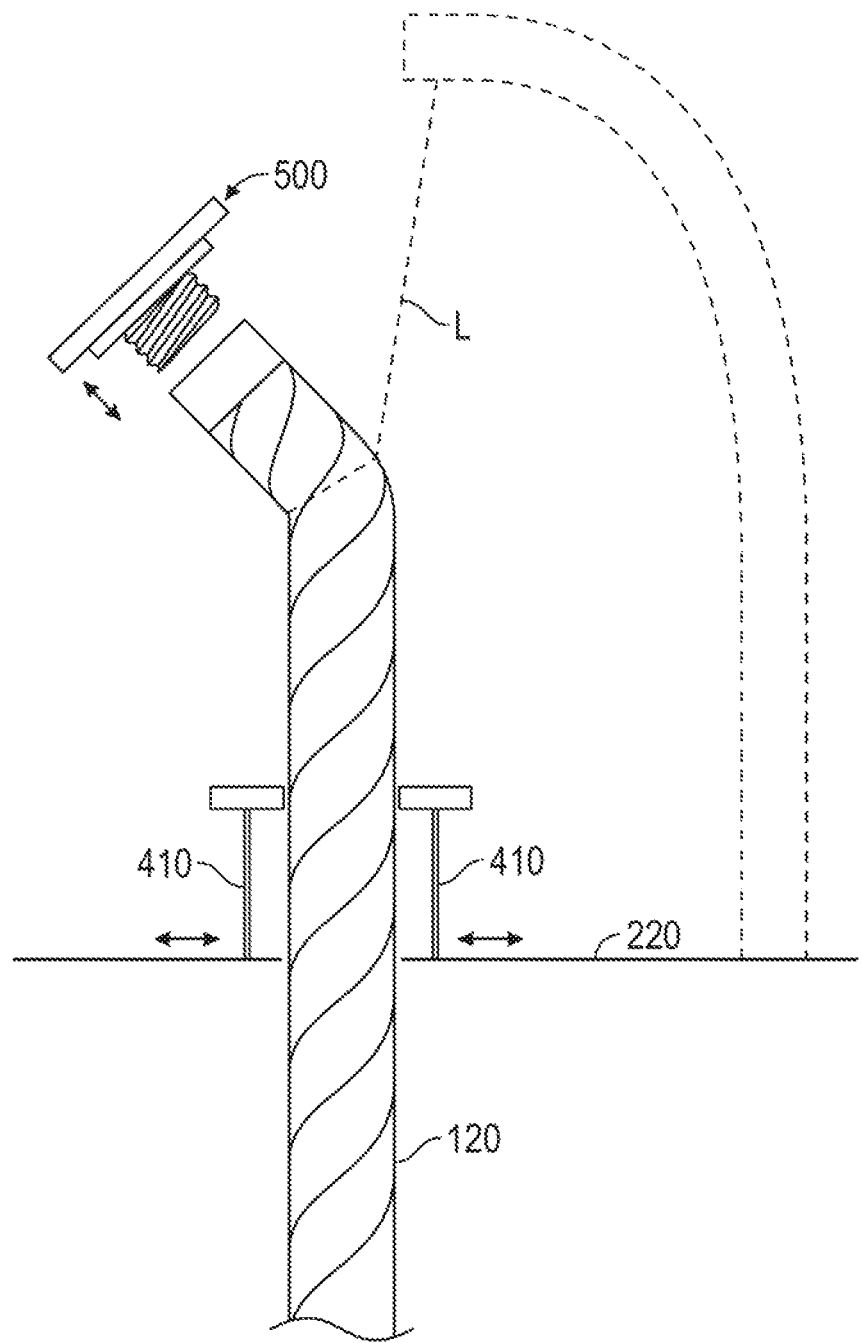
FIG. 6 is an elevational view from the right side (from the aft end of the vessel) of the harvesting platform portion of the device of FIG. 3, showing the movable mounting brackets, but with the wheeled guide omitted for clarity, showing a flange assembly being installed on the inboard end of the riser.

Referring to FIG. 6, shown is an elevational view from the right side (from the aft end of the vessel V) of the deck 210 of the harvesting platform 220, with the wheeled guide 180 and horizontally movable carriage 190 omitted for clarity. Horizontally movable mounting brackets 410 on the sides of the riser 120 are shown installed on deck 220 in a spaced apart configuration. The inboard end of the riser 120 has been removed from the riser spool 140 and retained by a line L (shown in dotted line) extending from a winch or crane W (also shown in dotted line), so that a flange assembly 500 can be installed on the inboard end of the riser 120. The flange assembly preferably consists of a round flange.

Figure 7:
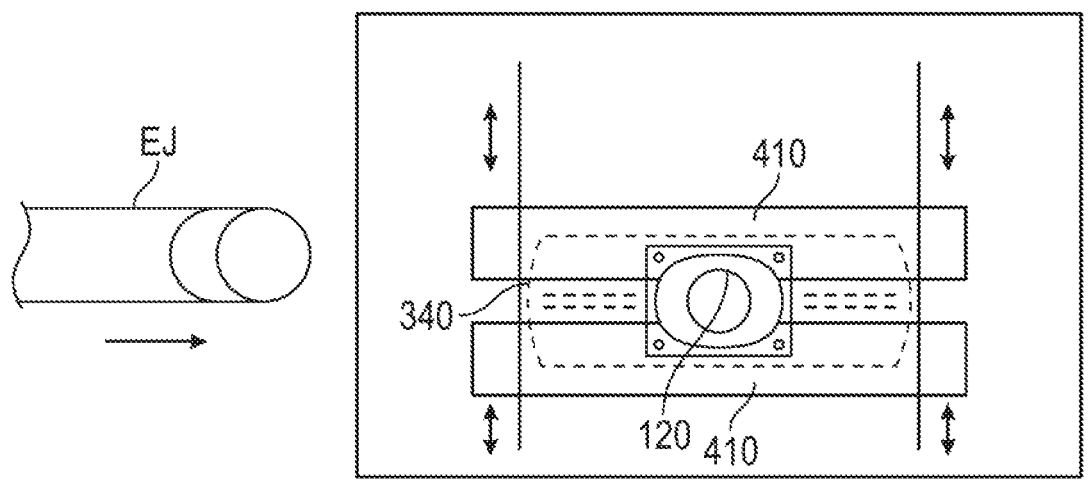
FIG. 7 is a top plan view of the harvesting platform portion of the device of FIG. 3, showing the movable mounting brackets but with the wheeled guide omitted for clarity, showing the flange assembly held by the mounting brackets and an elbow joint for the upstream portion of the invention ready to be engaged with the flange on the inboard end of the riser.

Referring to FIG. 7, shown is a top plan view of the deck 220 of the harvesting platform 210, showing the horizontally movable mounting brackets 410 in a retaining configuration, but with the wheeled guide 180 and carriage 190 omitted for clarity, in which the onboard end of the riser 120 is retained above the mounting brackets 410 by the flange assembly 500. An elbow joint EJ (shown in dotted line) leading to the downstream portion of the invention can then be attached to be in fluid communication with the inboard end of the riser by engaging with the flange.

The invention described and claimed herein is not to be limited in scope by the specific embodiments herein disclosed, since these embodiments are intended as illustrations of several aspects of this invention. For example, the invention is not limited to marine applications, but can be used in dynamic environment wherever long risers and cables with differential stretching must be deployed and retrieved. Any equivalent embodiments are intended to be within the scope of this invention. For example, the cable can be placed inside the riser at the time of manufacture, with different spools for the riser and the cable (such as with the riser containing the cable on a spool, and the cable extending out of the near end of the riser on the riser spool, and the cable then leading to a second spool for the cable. When the riser spool unwinds at a first rate and the riser (with the cable inside) stretches, the second spool for the cable can unwind at a different rate to address the differential stretch rates described above. For another example, electrically conducting material can be embedded in the riser in a manner that allows stretching at the same rate as the riser, such as by weaving electrically conductive material into the wall of the riser in a stretchable pattern. Indeed, various modifications of the invention in addition to those shown and described herein will become apparent to those skilled in the art from the foregoing description. Such modifications are also intended to fall within the scope of the appended claims. For example, the application of the current invention is not limited to just HA/DR applications. Indeed, the ability to create fresh water in a cost-effective manner offshore can be utilized in other commercial applications that require large quantities of raw, fresh, or brine water offshore or at coastal locations. Non-limiting examples of potential applications include, but are not limited to, applications requiring large amounts of fresh water such as aquaculture, agriculture, cement manufacture, and combinations thereof.

INDUSTRIAL APPLICABILITY

This invention can be used wherever long risers and cables must be deployed and retrieved from a moving vessel or vehicle.

The invention claimed is:
1. A deployment and retrieval device for a flexible riser and a cable operably connected at their distal ends to a cylindrical submersible pump approximately coaxial with said riser, on a vessel having a chine, comprising:
   a rotatable riser spool mounted on said vessel for winding and unwinding said riser for deployment and retrieval;
   a riser hydraulic drive drivably connected to said riser spool to drive rotation of said riser spool;

a rotatable cable spool mounted on said vessel for winding and unwinding said cable for deployment and retrieval;

a spool hydraulic drive drivably connected to said cable spool to drive rotation of said cable spool;

a flow control valve operably connected to one of said hydraulic drives to control rotation of one of said spools to rotate at a different rate from the other spool;

a hydraulic ram mounted to said vessel;

a movable carriage mounted on said hydraulic ram;

a wheeled guide mounted on said carriage to be horizontally movable by said hydraulic ram and said carriage along a throw centered in front of said spools;

whereby rotation of said spools at different rates allows winding and unwinding of said riser on said riser spool and winding and unwinding of said cable on said cable spool at different rates to compensate for differential stretch of said riser and said cable;

a riser guide attached to said vessel, positioned below said throw to receive said riser and said cable being wound and unwound from said spools, having an upper portion extending downwardly below said chine and having a junction below such upper portion with a bell flaring out from said upper portion by at least 15 degrees;

wherein said upper portion has a substantially constant cross section of a race track having two substantially parallel straightaways joined by two substantial semicircles;

wherein said semicircles have a diameter slightly greater than the diameter of said cylindrical submersible pump and said straightaways are slightly longer than said throw less said diameter of said submersible pump;

wherein said riser and said cable lead from said riser spool and said cable spool onto said wheeled guide, whereby winding and unwinding said riser spool and said cable spool deploys and retrieves said pump while minimizing fouling despite differential stretch rates of said riser and said cable, whereby said wheeled guide moves back and forth along said throw to wind and unwind said riser and said cable evenly on said spools, and whereby said riser and said cable are prevented from chafing against said chine by said riser guide and said bell.

2. A deployment and retrieval device for a flexible riser and a cable operably connected at their distal ends to a cylindrical submersible pump approximately coaxial with said riser, on a vessel having a chine, comprising:

a rotatable riser spool mounted on said vessel for winding and unwinding said riser for deployment and retrieval;

a riser drive drivably connected to said riser spool to drive rotation of said riser spool;

a rotatable cable spool mounted on said vessel for winding and unwinding said cable for deployment and retrieval;

a spool drive drivably connected to said cable spool to drive rotation of said cable spool;

a differential operably connected to one of said drives to control rotation of one of said spools to rotate at a different rate from the other spool;

a wheeled guide horizontally movable along a throw centered in front of said spools;

whereby rotation of said spools at different rates allows winding and unwinding of said riser on said riser spool and winding and unwinding of said cable on said cable spool at different rates to compensate for differential stretch of said riser and said cable;

wherein said riser and said cable lead from said riser spool and said cable spool onto said wheeled guide, whereby winding and unwinding said riser spool and said cable spool deploys and retrieves said pump while minimizing fouling despite differential stretch rates of said riser and said cable, and whereby said wheeled guide moves back and forth along said throw to wind and unwind said riser and said cable evenly on said spools.

* * * * *